INVENTOR
ROBERT L. WILLIAMS
BILL L. WADDELL
JOSEPH W. CROWNOVER
BY Charles G. Weigel, Jr.
ATTORNEY INVENTOR
ROBERT L. WILLIAMS
BILL L. WADDELL
JOSEPH W. CROWNOVER
BY Charles A. Weigel, Jr.
ATTORNEY INVENTOR
ROBERT L. WILLIAMS
BILL L. WADDELL
JOSEPH W. CROWNOVER
BY Charles A. Weigel, Jr.
ATTORNEY

INVENTOR
ROBERT L. WILLIAMS
BILL L. WADDELL
JOSEPH W. CROWNOVER

BY Charles A. Weigel, Jr
ATTORNEY 3,105,225

METHOD AND APPARATUS FOR UTILIZING FERROELECTRIC MATERIAL FOR DATA STORAGE

Robert L. Williams and Bill L. Waddell, San Diego, and Joseph W. Crownover, La Jolla, Calif., assignors, by mesne assignments, to Daystrom, Incorporated, Murray Hill, N.J., a corporation of Texas Filed Mar. 16, 1960, Ser. No. 15,344
6 Claims. (Cl. 340—173.2)

This invention relates to ferroelectric methods and apparatus and more particularly to a method and apparatus for storing information utilizing a ferroelectric material as the storage element.

In recent years much work has been done with ferroelectric materials. A large portion of this work has been directed toward the utilization of ferroelectric materials, such as barium titanate, as the ferroelectric element in memory or storage applications.

There is apparently no one complete theory encompassing all of the observed effects of ferroelectrics. However, the crystal structure and the domain mechanics of a ferroelectric material have been plotted as by X-ray defraction techniques. Thus, it has been found that ferroelectric materials possess a polar axis which is the result of a small spontaneous ionic displacement. This ionic displacement spans the structure bidirectionally by approximately 1% perpendicular to a given plane in respect to the remaining orthogonal planes. The bidirectional ionic displacement capabilities in a given direction apparently constitute the essential mechanism of charge for memory or storage applications.

Much of the prior work done toward using ferroelectric material for storage or memory applications is described in a WADC Technical Report 55-339, entitled "Determining the Usefulness of Barium Titanate Material for Memory Devices in Large Scale Digital Calculators," by C. F. Pulvari (PD 121384), which is available from the Office of Technical Services. Other work that has been done on the application of ferroelectric materials to storage systems is described in U.S. Patents Nos. 2,717,372 and 2,717,373, issued September 6, 1955 to J. R. Anderson.

As is typically described in the above-cited patents and report, as well as in many other articles, when a ferroelectric substance is subjected to an electric field, it exhibits a relationship between the electric field intensity and its capacitance which is in the general form of the hysteresis loop exhibited by ferromagnetic materials. By utilizing the ferroelectric material as the dielectric of a condenser, this hysteresis effect can be used for the storage and read out of information.

As is known, to store information, the ferroelectric material is polarized in one direction or the other to indicate the presence or absence of a bit of information. By direction of polarization is meant that phenomenon whereby certain crystals may exhibit a spontaneous dipole moment due to a polarization catastrophe, in which the local electric fields due to the polarization itself appear to increase faster than the elastic restoring forces on the ions in the crystal. This leads to an asymetrical shift in ionic positions and, hence, to a permanent dipole moment. The stored information is then "read out" by applying a reading voltage across the ferroelectric material to polarize the material in a predetermined direction. The magnitude of the pulse that passes through the ferroelectric material on the application of the reading voltage depends on the polarization direction of the ferroelectric material and thus on whether or not the bit of information had been stored in the ferroelectric material.

It is also known to utilize a single slab or wafer of a ferroelectric material to provide the dielectric of a large number of condensers. These condensers are provided with common electrodes. More specifically, the condensers may be arranged in a storage matrix and a particular condenser of the matrix chosen for storage of information by applying a voltage of one polarity to the common electrode on one side of that condenser and a voltage at the opposite polarity to the common electrode on the other side of that condenser. The two voltages individually are insufficient to reverse the polarization of that portion of the ferroelectric material lying between these two particular electrodes. But when the two voltages occur simultaneously and are of the proper polarity to change the polarization of the material of this condenser element, across which they simultaneously appear, it is possible to effect the storage and read out of information.

Unfortunately, most of the prior work that has been done in this area has been burdened with a basic deficiency of ferroelectric materials. This basic deficiency is known as the accumulation effect. The accumulation effect exists in matrix memories, particularly, since the half voltage pulses, which are applied along the common row and column electrodes, for example, while switching the selected capacitance element at the intersection of the two electrodes, also apply half voltage disturbing pulses to the other condenser, or memory, elements lying on the common electrodes. It has been found that there is apparently no threshold field for most ferroelectric materials below which switching cannot take place. That is, the application of these disturbing pulses has been found to be cumulative such that some finite number of fractional pulses will eventually switch the best of these materials. With typical materials that are utilized today, the number of fractional pulses required to actually switch the direction of half amplitude polarization of these materials is finite. An article entitled "Ferroelectric Storage Devices," appearing in the December 1958 issue of "Electronic Engineering," describes the accumulation effect and states on page 683 that the maximum number of fractional pulses which may be tolerated is limited to that number which will, in a typical employment of ferroelectric material, reduce the signal-to-noise ratio by a factor of three to one, for example.

Various systems have been devised in an effort to overcome this accumulation effect. Some, as described in the Anderson patents, have used multiple condensers; others isolating diodes. Unfortunately, most of these prior systems have been notable by their relatively high cost and relatively great complexity. Also, in many of the prior art systems, the driving circuitry had a somewhat high source impedance. This results, as described by Pulvari, in the condenser elements in the nonselected rows and columns of a typical memory matrix causing an undesired capacitive loading which severely limits the size of memory that it is practical to construct.

Accordingly, it is an object of this invention to obviate many of the inherent disadvantages of ferroelectric materials.

An additional object of this invention is the full utilization of the desirable qualities of ferroelectric materials in storing information, while overcoming the known deficiencies of ferroelectric materials.

It is another object of this invention to devise a method for obviating the accumulation effect present when ferroelectric materials are used in storage applications.

Still another object of this invention is to provide an improved ferroelectric storage matrix, which matrix facilitates the isolation of the nonselected ferroelectric elements of the matrix.

In one specific illustrative embodiment of this invention, a ferroelectric storage matrix may have a number of common electrodes extending in parallel on one face of a slab or wafer of a ferroelectric material and a number of common electrodes extending in parallel on the other face of the wafer and at an angle to the first group of electrodes. With this arrangement, each spatial intersection of the common electrodes of the two groups defines a memory condenser or element. An information address, identifying the particular address, location, or occurrence in the system in which the information to be stored relates, is applied to a pair of address selectors which, in turn, apply voltage V across a selected spatial element that is of sufficient magnitude to switch or reverse the polarity of polarization of that memory element.

In accordance with the method of this invention, suitable control means are associated with each of the selectors such that, during each memory cycle, opposite polarity pulses are applied to all memory elements lying on the selected row and column. This solution is based on the premise that a disturbed memory element, which has been subjected to a single fractional disturbing pulse of reversed polarity with respect to the original stored data, may be fully regenerated by the subsequent application of a single fractional pulse of opposite polarity but equal energy. By this method, no more than one disturbing pulse can be applied to a given memory element before it is regenerated.

More specifically, the method of operation is such that each disturbed memory element of a given matrix is subjected to two pulses of equal and opposite polarity during any given memory cycle which includes sensing and resetting. That is, there is no difference between the amplitude or number of pulses that is applied to a particular row and column of the memory matrix for sensing and resetting the selected memory element.

In one mode of operation, for example, a binary "one" is sensed; a logic circuit causes the reset fractional voltage pulses to be simultaneous. Applied simultaneously, their sum is sufficient to reset a binary "one" back into the selected memory element.

If, on the other hand, a binary "zero" is sensed, the logic circuit delays the application of the fractional voltage row (or column) reset pulse until the half-voltage column (or row) reset pulse has subsided. This action does not alter the amplitude or the number of reset pulses, but establishes a time sequence arrangement such that the selected memory element is subjected to two half-amplitude pulses rather than one full amplitude pulse. In this manner, the selected memory element remains in the binary "zero" state of polarization. Thus, even though all of the elements of the selected row and column electrodes are subjected to half-amplitude disturbing pulses at the time of sensing, or reset, they are soon regenerated by equal and opposite half-amplitude pulses. The apparatus employed to accomplish this method facilitates the grounding of all elements of the matrix except those in the particular row and column being sensed. The remaining elements of the matrix thus sustain little or no disturbing pulses because of their isolated condition due to the novel memory drive system of this invention. Because of this isolation, the capacitive loading is less and larger matrices using ferroelectric material are possible.

Further advantages and features of this invention will become apparent upon consideration of the following description read in conjunction with the drawings wherein.

Figure 1:
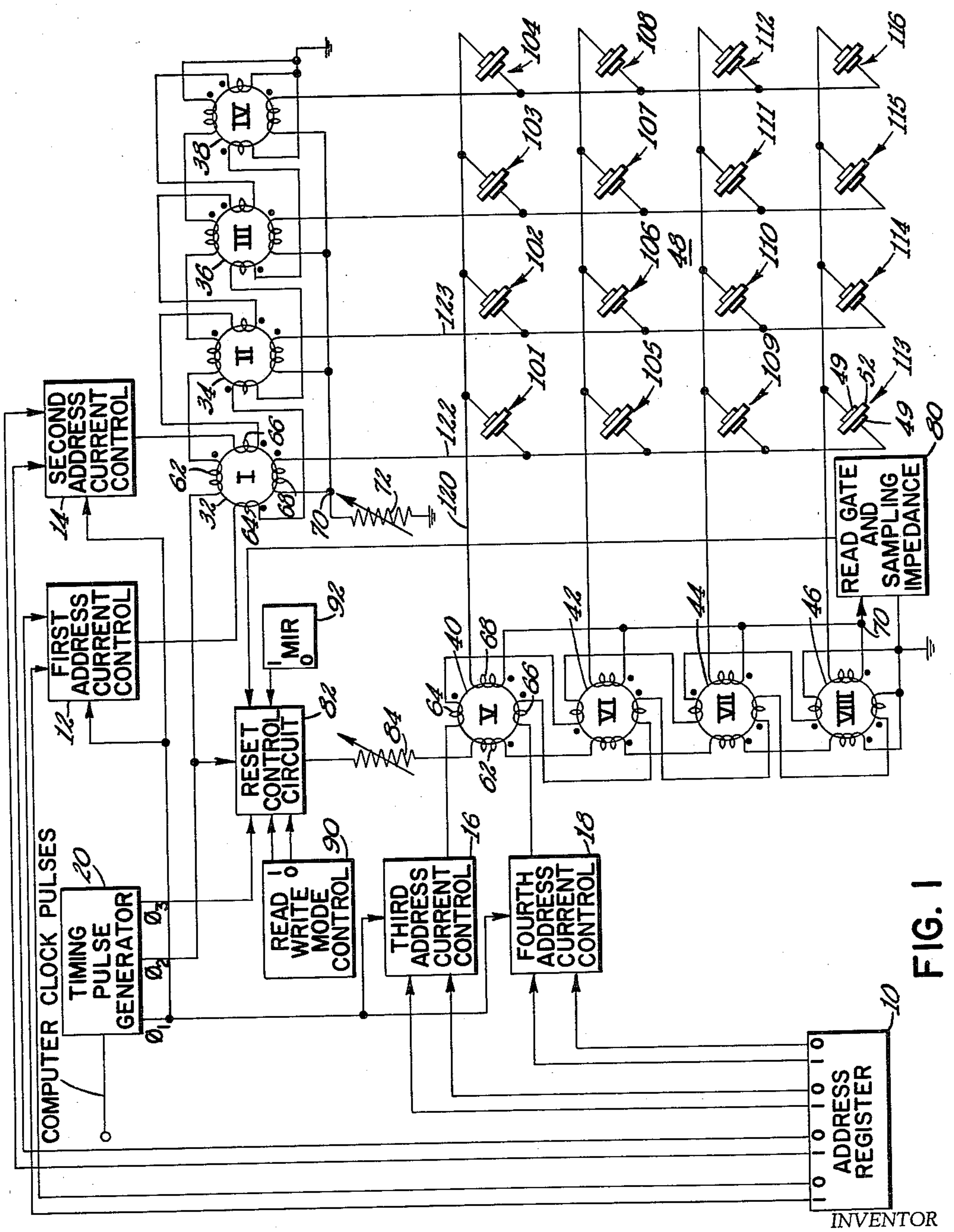
FIGURE 1 is a representation, partly in schematic and partly in block diagram form, of one specific illustrative embodiment of the ferroelectric storage system of this invention.

The structure and operation of one specific illustrative apparatus that may be employed in accordance with this invention are described with the aid of the partial block and partial schematic diagram of FIG. 1. By way of illustration, the apparatus is described as part of a computing system. The binary or digital information to be stored at a particular address or location in the memory system of FIG. 1 is identified by an address code which may be derived from an address register 10 in the computing system. This address may be in the form of a binary code as is typically used in a digital computer. This address is applied to a first and a second column-address, current-control circuit 12 and 14, respectively, and to a third and fourth row-address-control-circuit 16 and 18, respectively. The details of a suitable address-current-control circuit are illustrated in FIG. 6.

Each of the address-current-control circuits 12 through 18, inclusive, is actuated by the first one of a sequence of three timing pulses $\phi_1$, $\phi_2$ and $\phi_3$ that are derived from a timing pulse generator 20. The timing pulse generator 20 may have a synchronizing input pulse 22 that is derived from the clock pulse of a digital computer. Typically, the timing pulse generator may be of the type described in U.S. Patent 2,860,243, issued to M. Kaplan on November 11, 1958. If the Kaplan pulse generator is employed, only the first three timing pulses $Tp_1$ through $Tp_3$, inclusive, would be used. Alternatively, the three clock pulses $\phi_1$ through $\phi_3$, inclusive, may be derived from a binary counter that operates to count input clock pulses. Logic circuitry coupled to the output of each of the flip-flop stages included in the counter may then be used to select the three clock pulses $\phi_1$ through $\phi_3$, inclusive, in response to the binary counts zero, two, four, etc., in a modulo eight counter, for example.

Figure 4:
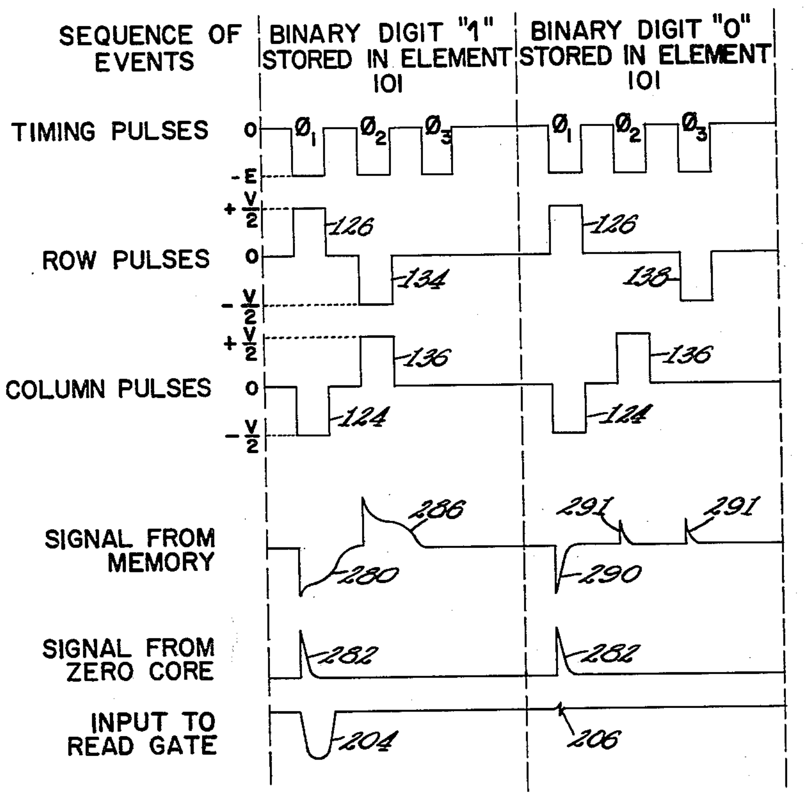
FIGURE 4 illustrates the waveforms of several of the pulses plotted against time that occur in the operation of the system of FIG. 1.

In this manner, the three timing pulses $\phi_1$ through $\phi_3$ appear sequentially at accurately spaced intervals as is illustrated in FIG. 4, for example.

Figure 6:
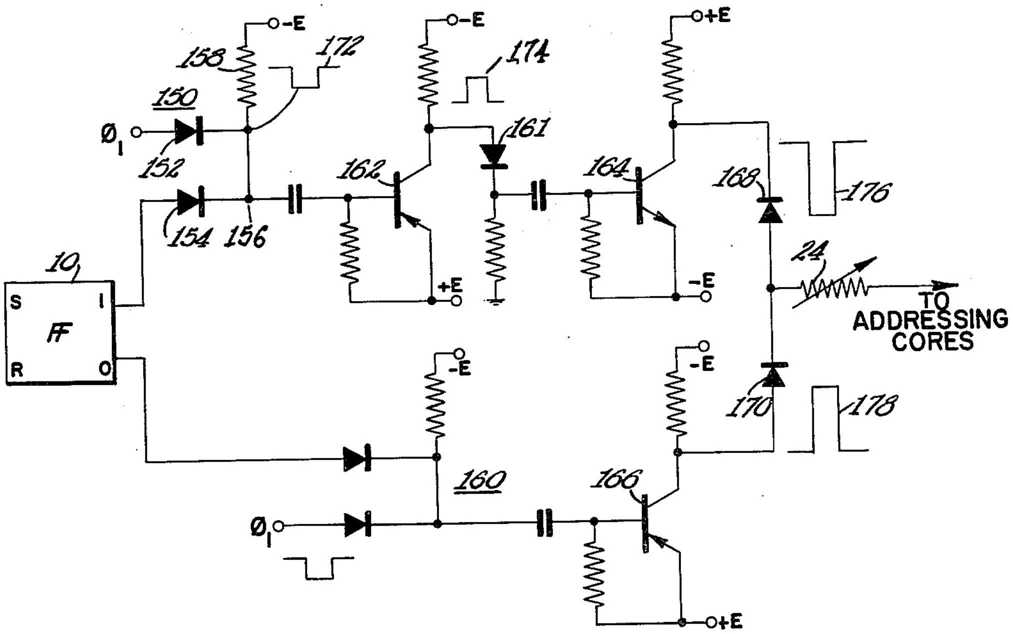
FIGURE 6 is a schematic diagram of a current control circuit that may be employed in the system of FIG. 1.

As is described in detail in conjunction with FIG. 6, each of the address-current-control circuits generates, with the occurrence of each of the first timing pulses $\phi_1$, an output pulse. This output pulse is negative-going in the event that the address input from the address register 10 is a signal representing a binary "one" and a positive-going pulse in the event the address input from the address register 10 is a signal representing a binary "zero." For reliability, the address-current-control circuits 12 through 18, inclusive, generate pulses having more than sufficient amplitude, which pulses are attenuated by internal variable resistors as illustrated in FIG. 6.

The row and column address-current-control circuits 12 through 18, inclusive, are connected respectively to row and column addressing cores 32 to 46, inclusive, which have been designated as I through VIII. The row and column addressing cores 32 through 46, respectively, are coupled, as will be described below, to apply pulses of designated polarity to that common row and that common column electrode of a ferroelectric storage matrix 48 which is designated by the address register 10.

Figure 3:
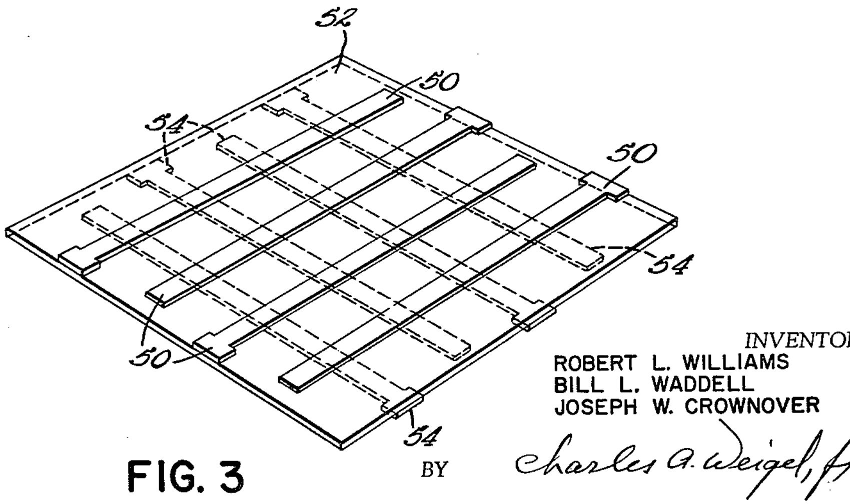
FIGURE 3 is a perspective view of a storage matrix formed on a wafer of ferroelectric material that may be employed in the specific embodiment of the invention set forth in FIG. 1.

The ferroelectric storage matrix 48 may advantageously be of the type illustrated in FIG. 3 wherein a parallel array of electrodes 50 is placed on one face of a slab, or wafer, of ferroelectric material 52, such as barium titanate, and a second parallel array of electrodes 54 is placed on the opposite face of the wafer. The two arrays may be perpendicular or at some other angle with respect to each other such that the several common electrodes intersect. Each spatial intersection forms a ferroelectric memory, or condenser, element. Typically, the wafer of ferroelectric material may be in the order of .005 inch to .01 inch thick. In the specific illustrative embodiment of this invention, the storage matrix is designed to store sixteen individual bits of information, each row and column array comprising four common electrodes. It should be apparent to those skilled in the art, however, that a much larger number of common electrodes 50 and 54 may be placed on the ferroelectric wafer 52 to provide a greater number of ferroelectric elements.

In order to store information in any ferroelectric element or condenser of the two dimensional matrix illustrated in FIG. 3, a voltage V is applied across the electrodes connected to that storage element. This may be accomplished in a known manner by simultaneously applying a fractional voltage of one polarity and having a magnitude ½V to the top electrode and a fractional voltage of the opposite polarity, but also of magnitude ½V to the bottom electrode. To read out all of the information in any selected element in the matrix, a single sensing, or read, pulse of equal amplitude, but opposite polarity, namely $-V$ volts, is applied to the row and column electrodes intersecting at that storage element. This negative voltage pulse $-V$ also may be obtained by the use of fractional pulses applied to each of the selected row and column common electrodes.

To facilitate a description of this invention, the bottom common electrodes 54 of the storage matrix 48, which are individually coupled to a different one of the column addressing cores 32 through 38, inclusive, will be referred to as a column and the condenser, or memory, elements formed by such common electrode as a column of memory elements. Also, the common electrodes 50 of the storage matrix on the top face of the wafer of ferroelectric material 52, which are individually coupled to a different one of the row addressing cores 40 to 48, inclusive, will be referred to as rows and the condenser, or memory, elements, formed thereby as a row of memory elements. These individual memory elements that occur at the spatial intersection of each of the row and column electrodes 50 and 52, respectively, are illustrated as individual condensers 101 to 116, inclusive, in FIG. 1.

Returning now to the drive circuitry for the matrix 48, each of the addressing cores 32 through 46 may be made of permalloy or similar material such as tape wound cores or cores made of a magnetic film, the requirement being that the material exhibit a magnetic hysteresis characteristic which when illustrated appears as a loop that is substantially rectangular. Each of the addressing cores 32 through 46 has a reset winding 62, a first-half-read winding 64, a second-half-read winding 66, and a drive or output winding 68. Each of the reset and drive windings 62 and 68 preferably has twice as many turns wound about its core as the first- and second-half-read windings 64 and 66.

The dots placed at either end of the windings on the cores indicate similar polarities. Thus, if the current flows through one winding so that the dot-end is positive-going, the field change about the core associated with that winding induces voltages in the other windings making their dot-end positive-going at the same time. Each of the column reset windings 62 is connected in series with each other between a point of reference potential, ground, and the source of timing pulses 20 such as to receive the negative-going second timing pulse $\phi_2$ (FIG. 4). In a similar manner, each of the column-first-half-read windings 64 is connected in series with each other between the first-address-current-control circuit 12 and ground. Each of the column second-half-read windings 66 is connected in series with each other between ground and the output of the second-address-current-control circuit 14. Finally, the column drive windings 68 each have one terminal connected to a common point 70 and thence through a variable balancing resistor 72 to ground. The second terminal of each of the column drive windings 68 is connected to a different one of the several common column electrodes 54.

As mentioned above, each of the row addressing cores 40 to 48, inclusive, has a reset winding 62, a first-half-read winding 64, a second-half-read winding 66 and a drive or output winding 68. Since these windings are essentially the same as those appearing on the column addressing cores 32 through 38, inclusive, the same reference numerals have been applied. Thus, each of the row drive windings 68 has a first common terminal 70 connected through a read gate and sampling impedance 80 (hereinafter referred to as read gate) to ground. The second terminal of each of the row drive windings 68 is connected to a different one of the several common row electrodes 50.

Note that the direction of winding of the row drive windings is opposite to that of the column drive windings. The purpose of this is to provide row drive pulses that are of opposite polarity to the column pulses provided by the several column addressing cores. Each of the row first-half-read-windings is connected in series with each other to be driven by the third-address-current-control circuit 16. In similar manner, each of the row second-half-read-windings 66 is connected in series with each other to be driven by the fourth-address-current-control circuit 18. Finally, each of the row reset windings 62 is connected in series with each other to be driven by what is termed a reset control circuit 82. The details of the reset control circuit are illustrated and described in conjunction with FIG. 7. For the present, it is sufficient to say that the reset control circuit 82 functions to sense the output of the read gate 80. As a result of this sensing, the reset control circuit 82 passes either the second or the third timing pulses $\phi_2$ or $\phi_3$, respectively, through the column reset windings 62. The reset control 82 also has a read-write input which may be controlled, for example, by a read-write mode control flip-flop 90 and a memory input register 92 both of which may form part of a computing system. The details of a suitable read gate 80 are likewise described below with reference to FIG. 5.

For ease of describing the operation of this invention, it will be stated that each of the addressing cores 32 to 46, inclusive, is driven toward what may be designated as negative saturation when energized by current flowing through one of the four windings in a direction such that the dot end is positive-going with respect to the non-dot end. Conversely, if the winding is energized by a current flowing such that the dot end is negative-going with respect to the non-dot end, the particular core is driven in the opposite direction toward what may be designated as positive saturation. If the particular energizing current is applied to either the drive windings 68 or the reset windings 62, depending upon the direction of the current, the several cores are driven or switched to positive or negative saturation.

On the other hand, if the energizing current is merely applied to one of the half-read windings 64 or 66, respectively, depending upon the direction of the current, the coersive force applied to the core is not sufficient to change the state of saturation of the core. It will be recalled that the half-read windings have only one half the number of turns the reset windings 62 have, for example. Thus, if the core was in a condition of negative saturation, the core will remain essentially in this condition in accordance with well-known magnetic storage techniques. If, however, a core is energized by the same current applied simultaneously through each of the half-read windings 64 and 66 and the field established by each of the windings is in the same direction, the combined effect is sufficient to change the state of saturation of the core.

The operation of the system of FIG. 1 may be described in connection with the hysteresis loop illustrated in FIG. 2 which represents the charge characteristics of a typical spatial ferroelectric memory element that exists in the ferroelectric memory wafer (FIG. 3). These memory elements are illustrated as individual condensers 101 to 116, inclusive, in FIG. 1, each having a pair of plates 49 with a dielectric 52 placed therebetween.

Figure 2:
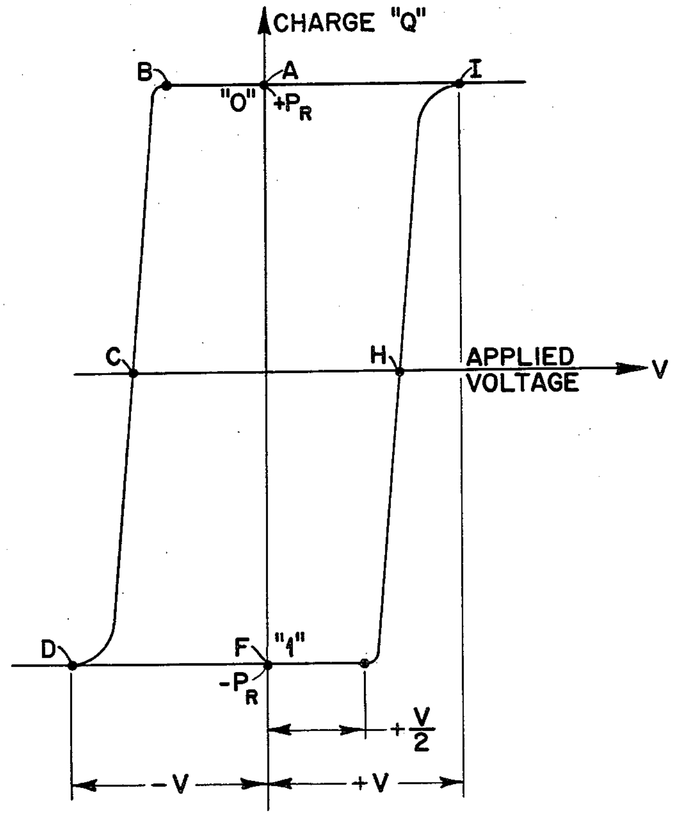
FIGURE 2 is a graph of a somewhat idealized hysteresis loop exhibited by a ferroelectric material used in the storage system of FIG. 1 in which the charge acquired by a ferroelectric memory element is plotted as a function of coersive voltage applied across the element.

The hysteresis loop illustrated in FIG. 2 comprises a plot of the relation existing between the voltage applied across the electrodes of the respective memory elements 101 to 116, inclusive, and the resulting integrated charge Q which passes through the condenser. As disclosed in the above-mentioned Anderson patents, the hysteresis loop advantageously approaches a rectangle in shape having a high ratio between the slopes of the side portions of the loop and the slopes of the top and bottom portions. The hysteresis loops depicting the characteristics of actual ferroelectric material may deviate somewhat from the idealized shape illustrated; however, the illustrated loop is used for clarity of explanation and the idealized ferroelectric behavior is selected primarily as a matter of convenience.

In the hysteresis loop of FIG. 2, the ordinate represents the internal charge Q acquired by the selected one of the ferroelectric memory elements 101 through 116. The charge Q is equal to the internal polarization P per unit area A of the electrodes for the selected spatial ferroelectric element. The abscissa of the hysteresis loop is the applied voltage V, which is equal to the product of the applied electric field strength E and the crystal thickness T. For any segment of the hysteresis loop, the capacitance C of the ferroelectric memory element is the ratio of change of polarization per unit volume to change in the applied field. Thus, if $Q=P/A$ and $V=ET$, $dQ/dV=(1/AT)(dP/dE)$. It is obvious from the figure that the rate of change of polarization, and thus the capacitance, is large when the memory element is operated under conditions exhibited by the steep parts of the hysteresis loop between the points G, H and I and the points B, C and D. Conversely, the rate of change of polarization, and thus the capacitance of the ferroelectric material, is low when the memory element is operated under conditions exhibited by the top and the bottom of the hysteresis loop between the points B, A, I and B, F, G.

The first time the voltage is applied to a memory element 101 to 116, inclusive, before it is polarized, its charge state may be zero for a zero applied voltage V as represented by the origin of FIG. 2. However, thereafter the typical hysteresis loop illustrated in FIG. 3 describes the charge-voltage relationship that exists in the memory element.

As is known, the application of a polarizing field such as will be established by the application of an applied voltage $\pm V$ will switch the ferroelectric memory element to one or the other of its stable charge states of positive or negative polarization, defined by the points $+P_r$ and $-P_r$ (FIG. 2), and it will remain in this state of remanent polarization even after the removal of the electric field. Hence, if the stable state denoted by point A on the hysteresis loop, which is the point of positive remanent polarization $P_r$, is said to represent the condition in which a binary "zero" is stored; then that indicated by point F, which is the point of negative polarization $-P_r$ corresponds to a binary "one."

If the ferroelectric material in one of the memory elements, such as the first memory element 101 (FIG. 1), is in a state of positive remanent polarization, then the application of negative electric field across the capacitor, as by the application of a negative switching voltage $-V$, switches the ferroelectric element 101 to a negative remanent direction of polarization as represented by the point F in FIG. 2. The condition of the ferroelectric element 101 during switching is illustrated by the hysteresis loop of FIG. 2 by the path moving from the point A to the left and down, following the switching path BCD, where the point D represents the saturated condition of negative polarization. With the removal of the negative switching voltage $-V$, the ferroelectric element 101 returns to its second stable state of negative remanent polarization $-P_r$ as exhibited by the path DF in FIG. 2.

Similarly with the application of the removal of a positive applied voltage $+V$, the resulting positive field causes the state of the ferroelectric element to change in the manner illustrated by the path moving to the right and up along the hysteresis loop of FIG. 2 from point F through point GH and on to point I, the point of positive polarized saturation. Again, with the removal of the applied voltage $+V$, the state of the ferroelectric element moves to the left from its saturated condition, illustrated by point I, to the point of positive remanent polarization $+P_r$ designated by point A, which represents the binary "zero."

As is known, information may be stored by applying a negative switching voltage $-V$ across a condenser element to store a binary "one" and conversely a positive voltage $+V$ across a condenser element to store a binary "zero." Information is then read out of the ferroelectric element by applying a sensing or read out voltage $+V$ so that the ferroelectric material is driven to a point of positive remanent polarization. Since $I=dQ/dt$, the changes in charge that occur with the polarization reversals can be observed by examining the flow of current through the capacitor by way of a series impedance. Under these conditions if a binary "one" has been stored so that the ferroelectric memory element is at negative remanent polarization, indicated by the point F on the hysteresis loop of FIG. 2, the sensing pulse is illustrated as causing the material to vary its charge in the manner illustrated by the steep portion of the hysteresis loop F, G, H, I, A, as described above, where the capacitance of the condenser is high.

On the other hand, if a binary "zero" had been stored with the application of the positive sensing voltage, the charge of the ferroelectric memory element varies as illustrated by the hysteresis loop, along the path AIA where the capacitance of the condenser is relatively low. In this manner, it will be observed that a large read out pulse is obtained when a binary "one" has been stored whereas a relatively small read out pulse occurs when a binary "zero" has been stored.

For the purposes of describing this invention, if a positive fractional or half-amplitude voltage pulse 126 (FIG. 4) of $+\frac{1}{2}V$ is applied along the upper common row electrode 120 (FIG. 1) and a similar negative-going pulse 124 (FIG. 4) of amplitude $-\frac{1}{2}V$ is simultaneously placed on the first column common electrode 122, the first memory element 101 appearing at the spatial intersection of these two electrodes may be said to be polarized in a positive direction. It will be recalled that this positive direction of polarization of the condenser was arbitrarily designated as representing a binary "zero."

Conversely, if the first condenser element 101 is excited by fractional, or half voltage, pulses 134 and 136 (FIG. 4), having a polarity opposite to that of the pulses 124 and 126, the first condenser element 101 is polarized in the negative direction to the remanent condition $-P_r$, designated by the point F (FIG. 2). Recall, that this negative remanent state of polarization was defined as a binary "one." Each of the remaining memory elements 102, 103 and 104 that are associated with the first row common electrode 120 will have this same fractional amplitude pulse 126 (FIG. 4) (which may be termed a disturbing pulse), applied to it. It can be seen from the hysteresis loop of FIG. 2, this fractional disturbing voltage, for example, ½V, is by itself insufficient to cause the material to reverse its direction of polarization. However, the repeated application of the disturbing voltage, without an intervening voltage of opposite polarity, may cause a sufficient number of domains of the ferroelectric material of these associated memory elements to reverse their polarization such that the memory element erroneously may reverse its direction of polarization. This is the accumulation effect which has been one of the basic deficiencies and difficulties encountered when it has been desired to employ ferroelectric materials for memory applications.

In accordance with the method of this invention, this accumulation effect may be substantially reduced by the following memory cycle:

(1) Simultaneously applying fractional amplitude sensing pulses to one of the row and one of the column electrodes to polarize a selected one of said memory elements in a predetermined direction; and (2) Simultaneously applying fractional reset pulses to the selected row and column electrodes in the event the sensed direction of polarization of the selected memory element differs from the predetermined direction of polarization; or (3) Sequentially applying fractional reset pulses to the selected row and column electrodes in the event the sensed direction of polarization of the selected memory element is the same as the predetermined direction of polarization.

To elaborate, any memory element, such as the first memory element 101, is first sensed, or read, by applying to both plates 49 half-voltage pulses of such polarity as to polarize the first memory element 101 in the positive direction. To achieve this, the column and row fractional amplitude pulses 124 and 126 simultaneously are applied by the first and fifth cores 32 and 40, respectively. Unfortunately, during sensing, the remaining memory elements 102, 103, 104, 105, 109 and 113*a*, which lie along the excited common row and column electrodes 120 and 122, may have been disturbed sufficiently to have caused some of the domains of ferroelectric material to reverse their polarization.

To prevent this domain reversal effect from becoming cumulative with succeeding sensing pulses, in accordance with this invention and depending upon the sensed binary condition of the first memory element 101, fractional amplitude opposite polarity reset pulses are applied either simultaneously or sequentially to the respective row and column electrodes 120 and 122. In this manner, no more than one fractional amplitude disturbing pulse is applied to any one condenser element, without that element being regenerated.

If, for example, the first memory element 101 had contained a binary "one," as represented by being polarized in a negative direction, during sensing it is switched to a positive direction of polarization. Since the memory element is now operating in a high capacitance region, as represented by the steep portion GHI of its hysteresis loop (FIG. 2), during switching, a relatively large output pulse 204 (FIG. 4) develops across the sampling impedance in the read circuit 80. This output pulse 204 (FIG. 4) passes to the reset control circuit 82 which senses that a binary "one" was stored in the first memory element 101. As a result, opposite polarity reset pulses 134 and 136 (FIG. 4) are applied simultaneously (as contrasted to sequentially) to the common row and column electrodes 120 and 122. The application of these opposite polarity reset pulses 134 and 136, respectively, switches the first memory element 101 back to its original condition of negative polarization representing binary "one."

If, on the other hand, the memory element 101 originally had been polarized in the positive direction to store a binary "zero," during the sensing cycle, the first memory element 101 operates over a low capacitance region of its characteristic. This region of operation is illustrated by the hysteresis loop of FIG. 2 as that portion denoted by the path AIA. As may be observed from FIG. 2, very little change in condenser charge occurs and, thus, little or no current flows through the sampling impedance in the read gate 80 thereby indicating a binary "zero." This binary "zero" is sensed by the reset control circuit 82 which acts to delay the application of the row reset pulse 134 so as not to coincide with the application of the column reset pulse 136. By thus varying the time sequence of the half amplitude reset pulses, the selected first memory element 101 is subjected to half amplitude sequential pulses rather than one full amplitude pulse and the stored binary "zero" is retained.

As may be observed from the hysteresis loop of FIG. 2, the two half amplitude pulses occurring in sequence are incapable of causing any appreciable change in polarization of the memory element 101. Hence, the memory element 101 remains polarized in the "zero" state.

The particular advantage of the memory cycle wherein each sensing cycle is followed by a rewrite cycle is that, although the memory elements lying along the selected row and column electrodes are disturbed during sensing, they are then pulsed by the equal and opposite reset pulses. By this technique, no more than one disturbing pulse can be applied to any given memory element, before it is regenerated.

For example, if the second memory element 102 had been positively polarized to store a binary "zero," the row sensing pulse 126 for the first memory element 101, being in a positive polarizing direction, produces no adverse effect. The row rewrite pulse, however, being of negative polarizing direction, tends to disturb its polarization. However, the very next memory cycle that applies a sensing pulse to the first row electrode 120 or the second column electrode 123 regenerates the second memory element 102 to its state of positive polarization. A similar case can be made for the instance where the second memory element 102 is negatively polarized to store a binary "one." Although disturbed by the row sensing pulse for the first memory element 101, it is regenerated by the row rewrite pulse.

Thus, in accordance with this invention, the cumulative effect of the fractional sensing pulses 124 on the remaining column condenser elements 105, 109 and 113 and the remaining row condenser elements 102, 103 and 104 is substantially eliminated. Although the condenser elements along the excited row and column electrodes are subjected to fractional (half amplitude) disturbing pulses at the time of sensing or reset, they are regenerated by an equal and opposite pulse before a maximum of two more pulses have occurred.

Having thus described the method of this invention, a particular desirable system for effecting this method using the row and column addressing cores 32 to 46, inclusive, will now be described. Briefly, the address register flip-flops 10 from the computing system, for example, operate through the address-current-control circuits 12 to 18, inclusive, to select a pair of the addressing cores 32 to 46, inclusive (one row and one column core), thereby to select a particular one of the condenser elements 101 to 116, inclusive. The logic for this addressing operation is set forth in the following table.

| Binary Address To Current Control Circuits | | | | Cores Selected | | Element Selected |
|---|---|---|---|---|---|---|
| 0 | 0 | 0 | 0 | I | V | 101 |
| 1 | 0 | 0 | 0 | II | V | 102 |
| 0 | 1 | 0 | 0 | III | V | 103 |
| 1 | 1 | 0 | 0 | IV | V | 104 |
| 0 | 0 | 1 | 0 | I | VI | 105 |
| 1 | 0 | 1 | 0 | II | VI | 106 |
| 0 | 1 | 1 | 0 | III | VI | 107 |
| 1 | 1 | 1 | 0 | IV | VI | 108 |
| 0 | 0 | 0 | 1 | I | VII | 109 |
| 1 | 0 | 0 | 1 | II | VII | 110 |
| 0 | 1 | 0 | 1 | III | VII | 111 |
| 1 | 1 | 0 | 1 | IV | VII | 112 |
| 0 | 0 | 1 | 1 | I | VIII | 113 |
| 1 | 0 | 1 | 1 | II | VIII | 114 |
| 0 | 1 | 1 | 1 | III | VIII | 115 |
| 1 | 1 | 1 | 1 | IV | VIII | 116 |

At the beginning of each memory cycle, which includes sensing and reset (write occurs during reset), each of the addressing cores 32 through 46 is magnetically saturated in what may be termed a positive direction P due to the preceding reset cycle. If now it is desired to read out the binary information stored by the first condenser element 101, the binary address 0000 (see logic table above) is inserted into the address register 10. In order to facilitate the marriage of the system of FIG. 1 with the typical circuits illustrated in FIGS. 5 through 7, a binary "zero" will arbitrarily be designated by a zero voltage level, or pulse, and a binary "one" by a —E volt level, or pulse (which may be in the order of —10 volts). Thus, each of the flip-flops in the address register 10 have their "one" output at ground potential and their "zero" output at —E volts.

Figure 5:
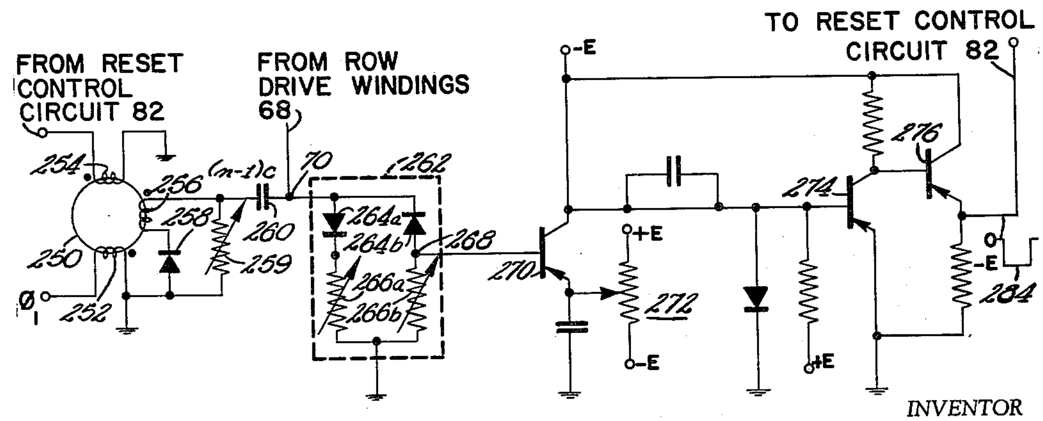
FIGURE 5 is a schematic diagram of a read gate and sampling impedance that may be employed in the system of FIG. 1.

Now, with the occurrence of the first timing pulse $\phi_1$, each of the address-current-control circuits provides a positive-going pulse, as is described in detail in conjunction with FIG. 5. These voltage pulses, which typically may be —E volts in amplitude to conform to the logic voltage levels set forth above, when applied to each of the first and second half-read windings 64 and 66, respectively, of the first column addressing core 32, are together sufficient to establish a flux that switches the first core from positive to negative saturation. It will be recalled that the cores are driven toward positive saturation if current is flowing into the dot end of the windings. Here, due to the pulses being applied to the non-dot end of the windings, the first core 32 is driven to negative saturation.

As the first core 32 changes from positive to negative saturation, the resulting flux change induces (with the dot convention adopted) the negative-going column sensing pulse 124 in the column drive winding 68. No flux is established in the second and third addressing cores 34 and 36, respectively, since the flux established by the first and second-half-read windings 64 and 66, respectively, of these cores is opposing. The flux in these cores, therefore, cancels and no voltage is induced in the drive winding 68 of the second and third addressing cores 34 and 36. The positive pulses applied from the address-current-control circuits, 12 and 14, to the first and second-half-read windings 64 and 66, respectively, drive the fourth core 38 toward positive saturation. Since the fourth core 48 was already in positive saturation at the beginning of the memory cycle, the resulting flux change is negligible and no output voltage results. The same analysis may be made with regard to the row address control circuits, 16 and 18 and the row addressing cores 40 to 46, inclusive. The result is that a positive going row drive pulse 126 is provided by the drive winding 68 of the fifth row core 40. This opposite polarity pulse is due to the fact that the row addressing cores drive windings 68 are wound in the opposite direction to those drive windings 68 on the column addressing cores 32 through 38.

Next with the occurrence of the negative-going second timing pulse $\phi_2$, each of the column-addressing cores 32 to 38, inclusive, is driven by the flux established by the column reset windings 62 toward positive saturation. Since the second, third and fourth column-addressing cores 34 to 38, inclusive, are already in a state of positive saturation, the flux change occurring in these cores is negligible, with the result that little or no output pulse is provided on their column output drive windings 68. The first core 32, however, being in a state of negative saturation due to its selection by the address-current-control circuits 12 and 14 during the sensing cycle ($\phi_1$) is returned to its condition of positive saturation. As this first column core 32 switches from positive magnetic saturation to negative saturation, the resulting large flux change induces the positive-going column reset pulse 136 (FIG. 4) in its drive winding 68. This pulse is applied to the common column electrode 122 thereby to apply a fractional reset voltage across the selected condenser element 101.

The operation of the driving arrangement for the row electrodes is somewhat different due to the function of the reset control circuit 82. If during the sensing cycle, a binary "one" (illustrated by the waveform 204 in FIG. 4) is sensed in the selected condenser 101, the reset control circuit 82 allows the second timing pulse to pass and energize the reset winding 62 of each of the row addressing cores 40 through 46. The third timing pulse is blocked. The second timing pulse $\phi_2$ drives each of the row addressing cores to negative saturation. Since the sixth, seventh and eighth addressing cores 42 through 48 are already in a condition of negative saturation due to the previous reset pulse, only the fifth row core 40 provides an output pulse. This output pulse is induced in the drive winding 68 of the fifth core 40 in a negative-going direction and is illustrated by the waveform 134 (FIG. 4).

If on the other hand, a binary "zero" (illustrated by the waveform 206 in FIG. 4) is sensed by the reset control circuit 82, the reset control circuit blocks the second timing pulse $\phi_2$ but allows the third timing pulse $\phi_3$ to pass. The third timing pulse $\phi_3$, acting through the row reset windings 62 in the same manner as the second timing pulse $\phi_2$, generates a row reset pulse 138 (FIG. 4) which is displaced in time so as to be sequential and not simultaneous to the column reset pulse 136. By this technique, as is described above, the binary "zero" is retained in the selected first condenser element 101 and yet the condenser elements 102, 103, 104, 105, 109, and 113 which lie along the selected row and column are regenerated. Thus, the cumulative effect of the fractional disturbing sensing pulses is substantially eliminated.

Note that the read gate and sampling impedance 80 may be coupled to the common point 70 in either the column or row drive windings 68. Note also that with the unique drive arrangement described, each of the row and column drive windings 68 is returned to ground. This arrangement has the advantage that all of the condenser elements in the memory that do not lie along the selected row and column electrodes are isolated by a low impedance path to ground. This low impedance path may readily be observed by tracing the drive pulse current path of the drive windings 68 of the first column-addressing core 32 from ground, through the variable resistor 72, the drive winding 68, the common column electrode 122, the memory element 105, the drive winding 68 of the sixth core 42, for example, and the sampling resistor in the read gate 80 to ground. Since the sixth core 42 is in a saturated condition, the fractional pulses 124 or 136 see little impedance. The amplitude of these fractional pulses is not sufficient to drive the sixth core 42 out of saturation. The result is that the nonselected condensers are in effect isolated by this low impedance path to ground and thus do not receive disturbing pulses. Each of the unselected row and column electrodes may be seen, by a similar analysis, to be grounded through a low impedance path to ground.

The usual form of ferroelectric material that has been employed in the past for the memory elements has been those materials that are less affected by fractional disturbing voltages. By the use of the teachings of this invention by which no element is subjected to more than one disturbing pulse before receiving a regenerating pulse, it is quite practical to use a wider range of materials than has been possible in the past.

For example, the use of barium titanate in the past has been generally limited to that type known as monocrystalline type C. In accordance with the unique concept of this invention, however, it is entirely feasible to also use the many polycrystalline forms of barium titanate. The latter type material is, in general, more susceptible to domain switching as the result of the fractional disturbing voltages that are applied to the common row and column electrodes.

Having thus described the method and apparatus of this invention, the several circuits that are employed therein will now be described. In FIGURE 5 there is illustrated a schematic diagram of a suitable circuit that may be employed for the read gate and sampling impedance 80. The read gate and sampling impedance 80 includes a zero cancel core 250 which is similar to each of the row and column addressing cores 32 through 46. The zero cancel core includes a zero cancel winding 252 having one terminal connected to receive the first timing pulse $\phi_1$ from the timing pulse generator 20 (FIG. 1) and the remaining terminal coupled to ground. The zero cancel core 250 also includes a reset winding 254 having one terminal connected to the reset control circuit 82 (FIG. 1) and the remaining terminal coupled to ground. A final drive winding 256 is also wound on the zero cancel core 250 and has one terminal coupled through the cathode of a diode 258 to ground and the remaining terminal connected through a compensating capacitor 260 to a sampling impedance circuit which is illustrated as included within the dotted rectangle 262. A variable resistor 264 is connected between ground and a common point between the output terminal of the output winding 256 and the capacitor 260 to provide a means of adjusting the amplitude of the output pulses provided by the zero cancel core 250. An input from each of the row drive windings 68 to the common point 70 (FIG. 1) is coupled to the sampling impedance 262.

The sampling impedance 262 includes a pair of parallel connected legs each of which includes a serially connected diode 264*a* and 264*b*, respectively, and a variable resistor 266*a* and 266*b*, respectively, connected in parallel between the common point 70 (FIG. 1) and ground. Each of the diodes 264*a* and *b* is connected in an opposite direction with respect to the common point 70 such that the left hand diode 264*a* will pass only positive-going pulses whereas the right hand diode 264*b* will pass only negative-going pulses to ground. The output from the sampling impedance circuit 260 is taken from a common point 268 midway between the diode 264*b* and variable resistor 266*b* in the right hand leg of the sampling impedance 260. The variable resistors 266*a* and *b* and the variable resistor 72 (FIG. 1) may be adjusted to balance the signals that are applied to the common row and column electrodes.

The output from this common point 268 is applied to the base electrode of a PNP transistor amplifier 270. The emitter electrode of the transistor amplifier 270 is coupled to a variable bias source 272 by which the transistor amplifier 270 may be made to respond only to negative-going signals at a predetermined negative amplitude. The output from the transistor amplifier 270 is coupled to a second PNP transistor amplifier 274, the output of which is coupled to the input of an emitter-follower transistor amplifier 276 which provides the negative-going output pulse varying with the bias voltages employed in this circuit between a quiescent condition of ground and −E volts so that the output from the emitter-follower amplifier 276 is a signal corresponding to the logic voltage levels set forth above, i.e., −E equals binary "one." The output from the emitter-follower transistor amplifier 276 is coupled to the reset control circuit 282 (FIG. 1).

The operation of the read gate and sampling impedance 80 will be described in conjunction with the waveforms illustrated in FIG. 4. If a binary "one" were stored in the first memory element 101, with the occurrence of the first timing pulse $\phi_1$, the current flowing through the first memory element 101 develops, across the sampling impedance 262, a negative-going pulse which is illustrated by the waveform 280 (FIG. 4). It will be noted that this output pulse illustrated by the waveform 280 has a rather sharp leading edge and is relatively long in time duration. As is known, in ferroelectric memory devices, this relatively sharp leading edge in the waveform 280 is caused by the capacitance of the selected memory element as well as that of the memory elements lying along, in this case, the same common electrode that was employed to energize the selected memory element. In this instance, the row electrode 120 is selected, and each of the memory elements 101 to 104, inclusive, contributes to the capacitance which creates this sharp leading edge of the waveform 280. Since this sharp leading edge appears during the sensing of the ferroelectric memory regardless of whether the sense element contains a binary "zero" or a binary "one," some means of discriminating against the leading edge must be employed. Several techniques are adaptable to produce the desired result. One such technique employs a strobe gate which may sample the memory output signal at some time duration after the initial spike due to the capacitance of the several ferroelectric elements has died down. Such gate is satisfactory for operation with this invention.

The circuit of FIG. 5 illustrates an alternative circuit that is suitable for discriminating against this sharp leading edge by use of a zero-cancel signal that is equal but opposite to the sharp spike pulse which results from this capacitive effect in the memory.

Thus, in FIG. 5 with the occurrence of the first timing pulse $\phi_1$, the zero-cancel winding 252 establishes a flux in the zero-cancel core 250 such as to create a positive-going spike 282 in the drive winding 256. This positive-going spike may be adjusted in amplitude by the variable impedance 259. This positive-going spike 282 is passed through the capacitor 260 which has a value $(n-1)C$ where C represents the saturated capacitance of each of the ferroelectric memory elements lying along the selected common row electrode 120 and $(n-1)$ the number of such elements other than the selected element 101. The purpose of this capacitor 260 is to shape the pulse generated in the drive winding 256 to be substantially identical in shape but opposite in polarity to the pulse created across the sampling impedance 262. In this manner the zero-cancel pulse 282, being equal in amplitude but opposite in polarity to the signal from the memory, cancels the leading edge of this latter signal. The resultant output signal developed across the resistor 266*b* in the right hand leg of the sampling impedance 262 is the output signal illustrated by the waveform 204 (FIG. 4) to the read gate. The output waveform 204 is amplified by the amplifier portion of the read gate of FIG. 5 and generates a negative-going output pulse 284 (shown in FIG. 5 adjacent the output portion of the amplifier circuit) varying between ground and −E volts. This output pulse passes to the reset control circuit 82 which detects the fact that a binary "one" has been read out of the memory.

During the second timing pulse $\phi_2$, which is the reset cycle of the memory, an output signal illustrated by the waveform 286 (FIG. 4) is developed across the sampling impedance 262 as a result of the large current flowing through the selected memory element 101 as it is switched from positive remanent saturation to negative remanent saturation thereby to retain the stored binary "one." Being positive-going, this signal represented by the waveform 286 passes through the left hand leg (264a, 266b) of the sampling impedance 262 to ground and provides no input to the read amplifier portion of the read gate and sampling impedance 80. In similar manner, during the second timing pulse $\phi_2$ the reset winding 254 of the zero-cancel core 250 returns the core to its quiescent state of positive saturation. As the core 250 is switched from negative saturation to positive saturation an output pulse tends to be generated in the drive winding 256, but is prevented by the action of the diode 258 which allows only positive-going pulses to pass to the sampling impedance 262. Thus, it is apparent that during the reset cycle of the memory, no disturbing pulses are allowed to pass through the read gate and sampling impedance 80 to disturb the action of the reset circuit 82.

If instead of storing the binary digit "one" the first memory element 101 had stored a binary digit "zero," the first timing pulse $\phi_1$ would have created a negative-going spike illustrated by the waveform 290 (FIG. 4) across the sampling impedance 262. As mentioned above, this negative-going spike would appear simultaneously with the equal amplitude but opposite polarity zero-cancel pulse 282 from the zero-cancel core 250 which cancels most, if not all, of this erroneous information pulse, leaving only a small amount of "noise" at the input to the read portion of the read gate and sampling impedance 80, as is illustrated by the waveform 296 of FIG. 4. This small "noise" disturbance is easily eliminated by adjusting the bias on the first transistor amplifier 270 by the bias control 272 such that the first transistor amplifier 270 will not conduct unless the negative-going signal exceeds a predetermined minimum value. Thus, by suitable adjustment of the variable bias source 272, the read gate and sampling impedance 80 provides no output to the reset control circuit in the event that the sensed memory element 101 contains a binary zero.

During the reset portion of the memory cycle small positive-going output signals illustrated as spikes 291 (FIG. 4) appear across the sampling impedance 262 due to the sequential row and column reset pulses 135 and 135'. These spikes are relatively small since the fractional amplitude reset pulses drive the memory element over a low capacitance portion of its characteristic. As illustrated in the hysteresis loop of FIG. 2, this state of operation is represented by the path ABA. As was the case for the reset signal 286 that occurred when a binary "one" had been sensed, the reset spikes 291 are shunted to ground through the left hand leg of the sampling impedance 262.

In FIG. 6 there is illustrated a schematic diagram of a suitable circuit that may be employed for the address-current-control circuit 12 through 18. Referring now to FIG. 6, a single flip-flop of the address register 10 (FIG. 1) that holds the binary address for the first address control circuit 12 is illustrated. This flip-flop may be a conventional bistable circuit such as that described in an application entitled "Digital Converter," S.N. 771,350, filed November 3, 1958, by Bevitt J. Norris et al., and assigned to Daystrom, Incorporated, which is a typical transistor flip-flop having a set (S) and a reset (R) input and corresponding "one" and "zero" outputs. Thus, when the flip-flop is set and the "one" output is high as represented by a ground, or zero voltage, the "zero" output is low as represented by a —E volt signal level. Conversely, if the flip-flop is reset, the "zero" output is high at ground potential, whereas the "one" output is low at —E volts. The "one" output of the flip-flop 10 is coupled to one input of an "and" gate 150. The second input to the "and" gate 150 is derived from the first timing pulse $\phi_1$ from the timing pulse generator 20 of FIG. 1.

The two inputs to the "and" gate 150 are coupled through respective first and second diodes 152 and 154 to a common point 156. The common point 156 is coupled through a resistor 158 to a source of negative potential having a value of —E volts to correspond to the input signal levels employed. A second "and" gate 160 is provided which is essentially identical to the first "and" gate 150. The only difference is that one of the inputs to the second "and" gate 160 is coupled to the "zero" output of the flip-flop in the address register 10.

The common point 156, which is the output of the first "and" gate 150 is capacitively coupled through a transistor inverter stage 162 and then capacitively coupled to the input of a transistor amplifier 164. In similar manner, the output of the second "and" gate 160 is capacitively coupled to the input of a second transistor amplifier 166. Note that each of the transistor amplifiers utilizes opposite conductivity transistors in order to provide opposite polarity output pulses as will be described below. A diode 161 is serially connected between the transistor inverter stage 162 and the transistor amplifier 164 poled to allow only positive-going pulses to pass to the amplifier. The outputs of each of the transistor amplifiers 164 and 166 are coupled through diodes 168 and 170, respectively, to a common output lead which is coupled in the case of the first address current control circuit 12 (FIG. 1) through a variable resistor 24 to the first half-read winding 64 (FIG. 1).

As mentioned previously, the operation of the address-current-control circuit is such that if the address input is a binary "one," a —E volt output pulse is generated. If the binary input from the address flip-flop is "zero," the output pulse provided is a +E volt pulse. Typically, the voltage E may be in the order of 10 volts.

In operation, if the address flip-flop contains a binary "one," with the logic voltages stated, a —E voltage level is applied to the second diode 154 in the first "and" gate 150. Under these conditions the second diode 154 is non-conducting. However, until the occurrence of the first timing pulse $\phi_1$, the first diode 152, having its input at ground level, conducts with the result that the voltage at the common point 156, which is the output of the first "and" gate 150, remains essentially at ground potential. The first timing pulse $\phi_1$ applies a —E volt pulse to the input of the first diode 152. Conduction ceases in the first diode 152 for the duration of the first timing pulse $\phi_1$. With both diodes cut off, the voltage at the common point 156 drops to the —E volt level of the supply voltage for the "and" gate. At the termination of the first timing pulse $\phi_1$, the voltage at the output of the "and" gate 150 (common point 156) again returns to ground level. This produces a negative-going output pulse, illustrated by the waveform 172, which is differentiated and applied to the inverter 162 which passes a narrow positive-going pulse illustrated by the waveform 174, to the input of the transistor amplifier 164. This positive-going inverted pulse 174 corresponds in time to the leading edge of the output pulse 172 from the "and" gate 150. With the occurrence of the inverted pulse 174, the transistor amplifier 164 provides a negative-going pulse. This negative pulse 176 passes through the diode 168 and variable resistor 24 to the column-half-read windings 64 (FIG. 1).

During these occurrences, the second "and" gate 160 does not pass an output pulse since the input from the address register flip-flop "zero" output remains at ground potential. If the address contained in the address register flip-flop 10 had been binary "zero," of course the reverse would have occurred, such that with the occurrence of the first timing pulse $\phi_1$, the "and" gate 160 generates a negative output pulse which when differentiated and amplified by the amplifier 166 would provide a positive-going output pulse illustrated by the waveform 178. This positive pulse 178 is coupled to the first half-read winding 64 of the column addressing cores through the diode 170 (FIG. 1). While the circuit illustrated in FIG. 6 is suitable for use with this invention, it should be pointed out that the invention is not limited to the use of this particular circuit, since any other suitable circuit capable of providing positive or negative pulses depending upon the address contained in the address register, may be employed.

Figure 7:
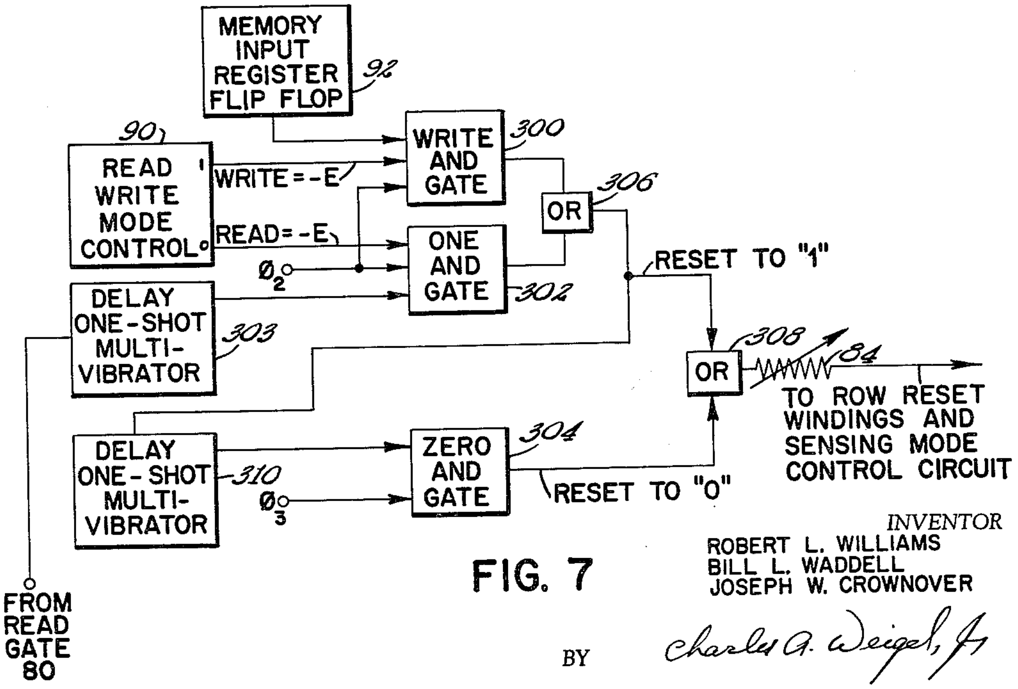
FIGURE 7 is a block diagram of a reset control circuit that may be utilized in the system of FIG. 1.

The details of suitable logic circuitry that may be used for the reset-control circuit 82 (FIG. 1) are set forth in block diagram form in FIG. 7. Basically, the reset control circuit 82 includes a "write and" gate 300, a "one and" gate 302 and a "zero and" gate 304. These "and" gates may be the same as "and" gate 150 described in conjunction with FIG. 6. The "write and" gate 300 is a three-input-coincidence gate receiving inputs from the memory-input register (MIR) flip-flop 92 (FIG. 1), the second timing pulse $\phi_2$ and the "one" output of the rewrite mode control flip-flop 90 (FIG. 1). In similar manner, the "one and" gate 302 is a three-input-coincidence gate receiving inputs from the "zero" output of the read-write-mode-control flip-flop 92 (FIG. 1), the read gate 80 (FIG. 1) through a delay multivibrator 303, and the second timing pulse $\phi_2$. The output of the delay multivibrator 303 is coupled to the "one and" gate 302 and generates an output that quiescently is at ground, and which drops to —E volts when triggered by "one" output from the read gate 80 for a time duration that overlaps the second timing pulse $\phi_2$. Thus, the "one and" gate 302 is primed when a "one" is sensed. The output of each of the "write" and "one" "and" gates 300 and 302, respectively, are coupled to an "or" circuit 306. The "or" circuit 306 is a conventional logic circuit capable of providing an output negative-going E volt pulse varying between ground and —E volts in the presence of an input —E volt signal on either of the two inputs from the gate 300 or 302, respectively.

The output of the "or" circuit 306 is coupled to provide a reset-to-binary "one" input to a second "or" circuit 308 and to the input of a delay one-shot multivibrator 310. The one-shot multivibrator 310 may be a conventional transistor multivibrator providing an output pulse that is quiescently at —E volts (to conform with the logic voltages that are employed in the illustrative circuitry in accordance with this invention). The one-shot multivibrator 310 output pulse rises to ground potential when triggered by a pulse from the first "or" circuit 306. The one-shot multivibrator 310 output remains at ground potential for the time period during the second and third timing pulses $\phi_2$ and $\phi_3$, respectively, such as to overlap the third timing pulse $\phi_3$. The output of the delay one-shot multivibrator 310 is coupled to one of the two inputs of the "zero and" gate 304. The remaining input for the "zero and" gate 304 is provided by the third timing pulse $\phi_3$. In turn, the output of the "zero and" gate 304 is coupled to pass the reset to "zero" signal to the second "or" circuit 308. The second "or" circuit 308 is, in turn, coupled through the variable resistor 84 to the column reset windings 62 (FIG. 1).

If the read-write-mode-control flip-flop 90 is in the read mode, its "zero" output is "high" and thus provides a —E voltage level which primes the "one and" gate 302. In this mode, whatever is read out from a memory element during sensing is reinserted during reset. In the read mode, if the "one and" gate 302 receives a —E volt "one" signal from the "read" gate 80 through the delay multivibrator 303, on the occurrence of the second timing pulse $\phi_2$, it provides a negative-going output pulse. This output pulse passes through the "or" gate 306 to generate a reset to "one" signal which passes through the second "or" gate 308 to each of the row-reset windings 62. In this manner, a row-fractional-amplitude pulse passes along the selected row common electrode simultaneously with the reset pulse that occurs during the second timing pulse $\phi_2$ along the selected column common electrode. The selected memory element is thus reset to binary "one" in the manner described previously.

The reset to "one" signal from the first "or" gate 306 is applied through the delay one-shot multivibrator 310 to remove the "high" priming level from the "zero and" gate 304. Thus, with the occurrence of the third timing pulse $\phi_3$, no output pulse is generated. The "write and" gate 300 is inhibited from providing an output by the low level signal from the "one" output of the read-write-mode-control flip-flop 90.

The read-write-mode-control flip-flop 92 also controls the writing of new information into the memory during each memory if such is desired. Thus, if the read-write-mode-control flip-flop 92 is placed in the write mode, wherein its "one" output is "high," i.e., —E volts and its complementary "zero" output is low, i.e., at ground potential. Depending upon the condition of the memory-input-register flip-flop 92, either a binary "one" or "zero" is stored in the ferroelectric memory during the reset cycle. For example, if the memory-input-register flip-flop 92 holds a binary "one" to be read into the memory, its "one" output is high, i.e., —E volts such that the "write and" gate 300 is primed both by the read-write-mode-control flip-flop 90 and the memory-input-register flip-flop 92. Thus, with the occurrence of the second timing pulse $\phi_2$, the "write and" gate 300 passes a negative-going E volt signal varying from ground to —E volts. This signal passes through the first "or" gate 306 to generate a "reset-to-one" signal. This "reset-to-one" signal functions in the same manner as if the signal had been received in the "one and" gate 302 as described above such that a binary "one" is stored in the selected memory element.

If, on the other hand, a memory-input-register flip-flop 92 had contained a binary "zero," its "one" output is low such that the "write and" gate 300 is not primed and fails to provide any output signal with the occurrence of the second timing pulse $\phi_2$. Under these conditions, the delay one-shot multivibrator 310 is unable to inhibit the "zero and" gate 304 such that, with the occurrence of the third timing pulse $\phi_3$, the "zero and" gate 304 passes a "reset-to-zero" signal through the second "or" gate 308 which functions in the manner as described previously to allow the selected memory element to remain in its binary zero polarized condition in which it was placed during the sensing portion of the memory cycle. Thus, a binary "zero" is stored in the memory.

It should be apparent to those skilled in the art that although the apparatus and method of this invention have been described with reference to a sixteen-element matrix, simply by applying the teachings of this invention, much larger matrices could be constructed. For example, the number or row or column addressing cores could be increased by two's merely by the inclusion of additional address-current-control circuits and a corresponding additional number of flip-flops in the address register 10 (FIG. 1).

There has thus been described a novel method and system for using a ferroelectric material as a memory element that substantially eliminates the cumulative effect of fractional voltage disturbing pulses upon the remaining ferroelectric memory elements lying along the selected row and column electrodes. By the system of this invention, no more than one fractional amplitude disturbing pulse is applied to any one condenser element without that element being regenerated by an equal and opposite fractional amplitude pulse.

In addition, the system of this invention provides a low impedance path for each row and column common electrode that is not selected during a particular memory cycle. By this technique, all of the ferroelectric condenser elements comprising the memory are isolated by a low impedance path to ground from the selected row and column electrodes. By using this system and method of this invention, both a wider range of and less expensive ferroelectric materials may be used to construct a ferroelectric type memory. In addition, the system and method of this invention provide a more reliable memory that is substantially free of the accumulation effect.

Since many changes could be made in the specific combinations of apparatus disclosed herein and many apparently different embodiments of this invention could be made without departing from the scope thereof, it is intended that all matter contained in the foregoing description or shown in the accompanying drawings shall be interpreted as being illustrative and not in a limiting sense.

What is claimed is:

1. In a ferroelectric data storage circuit, a plurality of condensers each having a dielectric of a ferroelectric material, a plurality of row electrodes electrically connecting one plate of each of said condensers in rows, a plurality of column electrodes electrically connecting the other electrode of each of said condensers in columns, each said dielectric having a substantially rectangular hysteresis loop, a plurality of magnetic cores each having first and second states of magnetic remanence and each being associated with a different one of said row and said column electrodes, a plurality of row and column drive windings each having a first and second terminal and being wound on a different one of said cores, said first terminal of each of said drive windings being connected to a different one of said electrodes, means including addressing windings wound on each of said cores for selectively driving only one of said cores associated with one of said column electrodes and only one of said cores associated with one of said row electrodes from said first to said second state of magnetic remanence, thereby to induce a voltage of one polarity in the corresponding row and column drive windings, a first impedance coupled between a point of reference potential and said second terminal of each of said row drive windings, a second impedance coupled between a point of reference potential and said second terminal of each of said column drive windings, whereby all condensers except those on the selected row and column remain isolated by said point of reference potential from said drive windings means including reset windings each wound on a different one of said cores for resetting the selected row and column cores from said second to said first state of magnetic remanence, and sensing means connected to said first impedance and to said resetting means and responsive to a voltage signal across said impedance means for sequentially energizing said resetting means, thereby to sequentially reset the selected row and column cores and induce voltages of a polarity opposite said one polarity in the corresponding row and column drive windings.

2. A ferroelectric matrix system comprising a ferroelectric matrix having a plurality of matrix leads, matrix driving circuitry including first, second, third and fourth addressing leads and first and second driving leads, a plurality of pulse transformers coupling said driving circuitry to said ferroelectric matrix, there being a pulse transformer connected to each matrix lead, each transformer having a core that exhibits a substantially rectangular hysteresis characteristic, each pulse transformer having three primary windings and a secondary winding, two of the primary windings of selected ones of said pulse transformers being directly electrically connected to said first and second address control leads and the two primary windings of the remaining ones of said pulse transformers being directly electrically connected to said third and fourth addressing leads, said first driving lead being directly electrically connected to the third one of the primary windings of said selected transformers, said second driving lead being directly electrically connected to the third primary windings of said remaining pulse transformers, output circuitry connected to each transformer secondary, and means electrically connecting said output circuitry to said matrix driving circuitry to delay the energization of one of said selected pulse transformers with respect to the energization of said remaining pulse transformers in response to the absence of an output signal produced in said output circuitry, whereby the cumulation effect of successive pulses applied to said ferroelectric matrix is reduced.

3. The matrix system set forth in claim 2 which includes means for by-passing said delaying means in the presence of said output signal produced in said output circuitry, whereby said selected transformers and said remaining transformers each provide a simultaneous pulse upon the occurrence of a driving signal on said driving leads.

4. The matrix system set forth in claim 2 wherein each of said first and second primary windings of each of said selected and said remaining pulse transformers are wound on their respective cores in such direction that when said first, second, third and fourth addressing leads are energized, only one of said selected and only one of said remaining pulse transformer cores is driven from said first to said second state of magnetic remanence, and wherein each of said drive windings is wound in such direction that when energized it drives its respective core from said second state to said first state of magnetic remanence, whereby said driving circuit has a relatively low impedance due to the substantial saturation of the cores of the pulse transformer.

5. Apparatus for recording and reproducing data such as bits of information, said apparatus comprising a ferroelectric element having a pair of electrodes, a pair of pulse transformers, each of said transformers including a core having first and second states of magnetic remanance and a primary having a pair of windings of a predetermined number of turns, and a third winding having twice the number of turns as either of said pair of windings, and also including a secondary winding, one of said secondary windings being connected electrically in series with one of said ferroelectric element electrodes and the other of said transformer secondary windings being connected electrically in series with the other of said ferroelectric element electrodes, and two pair of addressing leads, one of said pair of addressing leads being directly electrically connected to corresponding ones of said primary pair of windings and the other pair of said addressing leads being directly electrically connected to corresponding ones of said other transformer primary pair of windings to drive each of said transformer cores from said first to said second state of magnetic remanance, and a pair of driver leads, one of said driver leads being directly electrically connected to the driver winding of one of said transformers, the other of said driver leads being directly electrically connected to the driver winding of the other one of said pulse transformers to drive one of the other ones of said cores from said second to said first state of magnetic remanence, thereby to produce an electric pulse in the secondary winding forming a part of said transformer, whereby a voltage is produced across said ferroelectric element having a magnitude which is the sum of the magnetization of the pulses produced in said transformer secondaries.

6. The apparatus set forth in claim 5 which includes a sensing impedance means serially connected with one of said secondary windings, and means connected between said impedance means and one of said driver leads for delaying the application of a pulse to one of said driver leads in the absence of a voltage signal across said impedance.

References Cited in the file of this patent

UNITED STATES PATENTS

| | | |
|---|---|---|
| 2,918,655 | Pulvari | Dec. 22, 1959 |
| 2,955,281 | Brennemann | Oct. 4, 1960 |